Patented Jan. 21, 1936

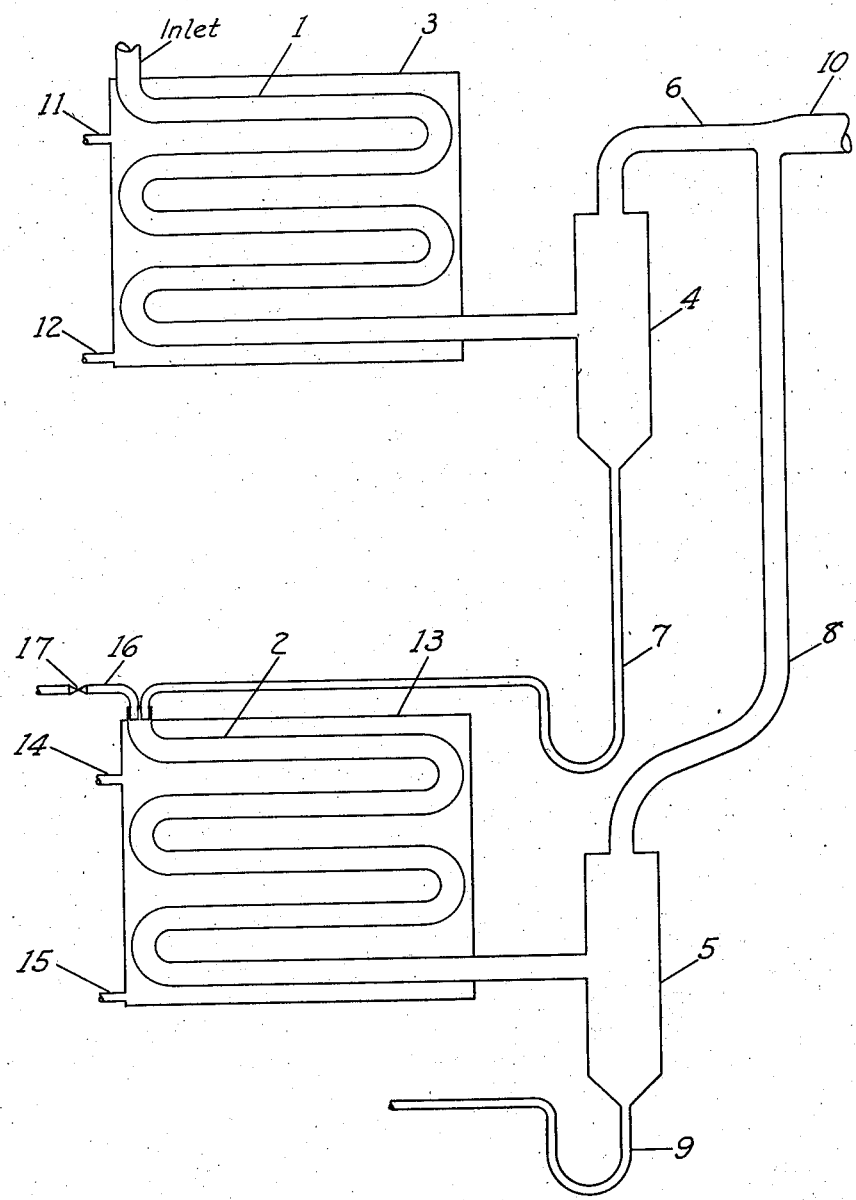

2,028,481

UNITED STATES PATENT OFFICE 2,028,481

METHOD OF DISTILLATION

Carl William Tucker and Frank Dorrill, Niagara Falls, N. Y., assignors to E. I. du Pont de Nemours & Company, Inc., Wilmington, Del., a corporation of Delaware Application July 29, 1933, Serial No. 682,826

9 Claims. (Cl. 202—52)

This invention relates to the manufacture of hydrogen peroxide and more particularly to the hydrolysis of persulfuric acid or persulfate solutions and the separation of the resulting hydrogen peroxide by vacuum distillation.

In various known methods of preparing hydrogen peroxide, solutions of persulfuric acid or a persulfate; e. g., ammonium persulfate, are prepared by the electrolysis of appropriate solutions. These are then subjected to vacuum distillation whereby the persulfuric acid or persulfate is hydrolyzed to form hydrogen peroxide and regenerate sulfuric acid or the sulfate; the hydrogen peroxide formed is separated from the solutions by distillation. By rectification, the distillate may then be concentrated to any desired strength of hydrogen peroxide.

Various methods and apparatus have been proposed for the hydrolysis and vacuum distillation of persulfuric acid or persulfate solutions. A method commonly used is continuous vacuum distillation in a short, tubular still, the vapors leaving the top of the still and the residual liquor continuously leaving at the bottom of the still. Such stills are usually made of quartz or glass because of the highly corrosive properties of the solutions and in order to prevent contamination of the peroxide with metals. A difficulty with these quartz or glass stills has been that the rate of heat transfer is relatively low. Consequently means were sought to enable a metallic material which has a higher heat conductivity to be used as the material of still construction. Various means have been proposed for using stills of metallic construction, while avoiding the corrosive action of the persulfuric acid. One of these which is described in Baum, U. S. Patent No. 1,854,327, comprises passing the liquid through a steam heated metal tube in such manner that the inside wall of the tube is at all times covered with a continuous film of liquid. This method reduces corrosion to a minimum and permits a higher rate of heat transfer than was possible with the glass or quartz stills used heretofore. However, in the Baum method the operation must be very carefully controlled in order to insure that the liquid film covers the metal at all times to avoid corrosion. Furthermore, in any of the processes heretofore used it has not been possible to attain a distillation efficiency of over 80 to 85% in large-scale production; that is, not over 80 to 85% of the persulfuric acid or persulfate is recovered as hydrogen peroxide in the distillate. Hydrogen peroxide losses in these prior processes are caused first, by incomplete hydrolysis, second, by decomposition of the hydrogen peroxide that is formed and third, by incomplete removal of the hydrogen peroxide after hydrolysis. The decomposition is caused mainly by elevated temperatures and also so some extent by the catalytic effect of certain impurities, notably, heavy metals and their compounds. Furthermore, we have discovered that the decomposition of hydrogen peroxide is more apt to occur when contacted with rough surfaces than with smooth surfaces. The slight amount of corrosion which will occur even under optimum conditions in a metallic still produces rough surfaces which have a certain catalytic effect in decomposing the hydrogen peroxide.

Of the peroxide lost from the various types of stills, considerable amounts have been found in the residual liquors. These liquors usually contain hydrogen peroxide and persulfuric acid or persulfate in concentrations equivalent to 50 to 120 grams per liter of persulfuric acid. If the temperature be raised to attempt to recover this peroxide, or if the heating time be lengthened, increased decompositions occur throughout and as a result the yield is not increased or even may be decreased.

An object of this invention is to provide an improved process for the hydrolysis and distillation of persulfuric acid or persulfate solutions, whereby a higher percentage of recovery of hydrogen peroxide is obtained than has been possible in the methods used heretofore. A further object is to provide an improved means for distilling persulfuric acid or persulfate in non-metallic apparatus. Our invention also includes an apparatus suitable for carrying out our novel process. Further objects will be apparent from the following description of our invention.

The above objects are attained by distilling persulfuric acid or persulfate solutions under reduced pressure, preferably in non-metallic apparatus, and adding water or water vapor to the distillation mixture during the course of the process. The vapors produced consist of hydrogen peroxide and water which if condensed form a dilute solution of hydrogen peroxide.

The appended drawing illustrates one form of apparatus suitable for carrying out our invention. A coiled glass tube 1 is fitted with a steam jacket 3 into which steam is introduced by pipe 11 and from which condensate is removed by pipe 12. The lower extremity of tube 1 is connected with a liquid vapor separator 4 preferably made of ceramic material, which has a vapor outlet 6 and a liquid outlet 7. The liquid outlet 7 is connected through a suitable liquid seal to the upper extremity of a coiled glass tube 2 which is practically identical with tube 1. The liquid seal is made by forming a U-bend in tube 7, as shown in the drawing. The upper end of tube 2 is also connected with a steam or water inlet 16, which is fitted with control valve 17. Tube 2, like tube 1, is fitted with a steam jacket 13, provided with steam inlet 14 and condensate outlet 15. Tube 2 terminates in a liquid vapor separator 5 which is provided with vapor outlet 8 and liquid outlet 9.

Tube 9 is bent to form a suitable liquid seal in the manner of tube 7. Vapor outlets 6 and 8 are both connected to a common vapor line 10 which carries the combined vapors to suitable apparatus for condensing or rectifying the vapors, which in turn is connected to a vacuum pump.

We have discovered that in order to obtain substantially complete hydrolysis of persulfuric acid by distilling a dilute solution thereof, it is necessary to add water thereto during the distillation. We believe that the need for additional water is caused by the disappearance of available water by (a) reacting with persulfuric acid to form $H_2O_2$, (b) reacting with the sulfuric acid formed to form hydrates, and (c) evaporation, i. e. transfer of water from the liquid phase into the vapor phase.

In the single-stage distillation methods heretofore used, the effluent liquid phase always contains considerable amounts of hydrogen peroxide together with more or less persulfuric acid or persulfate. Little of the free hydrogen peroxide can be removed by distilling these liquid residues, possibly because their boiling points are so high that undue decomposition occurs when distillation is attempted. We have found that by adding water to such residues, the free hydrogen peroxide can be substantially completely removed therefrom, with very little decomposition. Hence, by adding water, either as liquid or vapor, at one or more points in a continuous distillation arrangement, the amount of $H_2O_2$ vapor formed is correspondingly increased. In other words, we have found that when a dilute persulfuric acid solution is distilled, the amount of water available for hydrolysis constantly decreases until a point is reached where the rate of hydrolysis is too low for practical purposes. In accordance with our invention, at or prior to the point where the rate of hydrolysis becomes low, we add sufficient water to hydrolyze the remaining persulfuric acid.

Although the addition of water during the distillation increases the yield of hydrogen peroxide, this alone is not sufficient to obtain the maximum yield. We have found that if the hydrogen peroxide and water vapors are removed and the residual liquid is then distilled with the addition of water or steam, the yield will be further increased and the residual liquid from the second distillation will contain little or no peroxide values. We therefore provide for vapor separation adjacent or prior to the water addition. If desired, the addition of water to residual liquid and distillation thereof may be carried out through any number of stages, in order to substantially completely remove the last traces of peroxide. However, for practical purposes, a two-stage operation is preferred.

One method for carrying out our invention will be described by reference to the drawing. A dilute solution of persulfuric acid, for example, the product of electrolysis of sulfuric acid, is introduced into the apparatus at the upper extremity of tube 1 while a pressure of 120 to 200 mm. of mercury is maintained throughout the apparatus by means of a suitably connected vacuum pump. The temperature within the still will vary, depending on the rate of flow of the liquid and the temperature applied to the exterior. We prefer to operate so that the internal temperature does not exceed about 120° C. As the liquid flows through tube 1 the persulfuric acid is rapidly hydrolyzed to form sulfuric acid and hydrogen peroxide and part of the hydrogen peroxide and water is vaporized. As the still products pass through the separator 4, the vapors, consisting of hydrogen peroxide and water, pass out through outlet 6, while the residual liquid, consisting of a dilute solution of sulfuric acid containing some hydrogen peroxide and persulfuric acid, passes out through tube 7. Upon entering tube 2, the liquid from tube 7 meets a current of steam which is continuously introduced through tube 16 and is controlled by means of valve 17. In place of steam we may also carry out the process by adding water by way of tube 16; however, we prefer to use steam, since this decreases the time required for the liquid introduced into tube 2 to reach its boiling point. The pressure and temperature in tube 2 preferably are maintained at about the same values as in tube 1; however, a different temperature and pressure may be used in the second still if desired. The mixture of liquid and vapor leaving tube 2 is separated by means of separator 5 into vapors of hydrogen peroxide and water which leave by way of tube 8 and the residual liquid which leaves by way of tube 9. This residual liquid consists of aqueous sulfuric acid and contains little or no persulfuric acid or hydrogen peroxide. The vapors leaving separators 4 and 5 by way of tubes 6 and 8 pass together through line 10 and thence to suitable condensing or rectifying apparatus. By means of the above described process, 90% or more of the persulfuric acid may be converted into hydrogen peroxide recovered as the distillate.

Preferably we operate the process in two stages. In the first stage at least the greater part of the persulfuric acid is hydrolyzed and part of the hydrogen peroxide driven from the solution. In the second stage, the residual liquid from the first stage is distilled in the presence of additional water or water vapor. In this way, sufficient water may be added during the second stage to cause substantially all of the remaining hydrogen peroxide to be completely separated from the liquid. Obviously, our method is not limited to a two-stage process but the process of adding water and distilling the residue may be carried out in any desired number of stages. However, for practical purposes a two-stage method is sufficient to give a high distillation efficiency.

It will be noted in connection with the above explanation of our process that the addition of the water in the second distillation stage avoids increasing the temperature in order to get more complete removal of the hydrogen peroxide. One advantage of this is that by the avoidance of high temperatures the decomposition of the peroxide is materially decreased. Another advantage of this method of operation is that we thereby avoid the necessity of providing for the rapid input of large quantities of heat. Hence, our invention avoids the necessity of using materials of construction which have a high heat conductivity and thus permits the use of glass and other ceramic materials which are not corroded by the liquid or vapors being distilled, which may have smooth surfaces and which have substantially no catalytic effect on the decomposition of hydrogen peroxide.

Our invention may be further illustrated by the following examples:

*Example I*

A vertical, helical coil of glass tubing having an internal diameter of $\tfrac{5}{16}$ inch and a length of about 20 feet was arranged to be heated by the introduction of steam into a surrounding steam jacket. The lower end of the coil was sealed to a separating chamber, the vapor outlet of which was connected to a condenser and receiver. A vacuum pump was suitably connected to the apparatus to permit maintenance of a pressure of less than one atmosphere therein. Two liters of a solution of persulfuric acid, containing 267 grams of persulfuric acid per liter, which was obtained by the electrolysis of sulfuric acid was passed through the coiled tube, while heat was applied by a steam pressure of about 20 pounds per square foot and the pressure in the apparatus was maintained at about 90 mm. of mercury. The mixture of liquid and vapor was separated in the separating chamber and the resulting liquid-free vapors were condensed to form a dilute hydrogen peroxide solution. The liquid residue was diluted with an equal volume of water and was then re-distilled by passing it through the same apparatus under the above described conditions. The distillates from the two distillations were mixed; and the mixed distillate and the liquid residue from the second distillation were each analyzed for hydrogen peroxide and persulfuric acid. The total distillate measured 2150 c. c. and contained 3.7% by weight of $H_2O_2$. Further data is tabulated below:

|  | Weight | Percent |
| --- | --- | --- |
|  | Grams |  |
| $H_2S_2O_8$ equivalent of $H_2O_2$ in distillate | 485.90 | 90.99 |
| $H_2S_2O_8$ equivalent of $H_2O_2$ in residue | 26.32 | 4.92 |
| Unreacted $H_2S_2O_8$ in residue | 5.64 | 1.05 |
| $H_2S_2O_8$ equivalent of $H_2O_2$ decomposed (by difference) | 16.14 | 3.04 |
| Total | 534.00 | 100.00 |

*Example II*

An apparatus similar to that shown in the appended drawing was used in a number of runs for the distillation of a solution obtained by the electrolysis of sulfuric acid and which contained approximately 260 grams per liter of persulfuric acid. Each of the two tube stills consisted of a coil of glass tubing, 1 inch inside diameter by about 50 feet in length. During each run, the pressure within the two stills, as measured at the inlet to the first still, was maintained at about 135 millimeters of mercury, while the solution was passed in at the rate of 20 to 35 liters per hour. The steam pressure maintained in the steam jackets 3 and 13 surrounding tubes 1 and 2 was maintained at about 30 pounds per square inch, corresponding to temperatures of 122 to 127° C. on the exterior of the tubes. The vapors obtained were condensed by passing them through a water cooled, block tin tube. The distillate collected in the receiver and the residual liquor were analyzed for hydrogen peroxide and persulfuric acid. The results obtained are given in the following table, in which the term "overall efficiency" expresses the percentage of the total hydrogen peroxide equivalent in the original persulfuric acid solution which was recovered as $H_2O_2$ in the distillate.

| Run | Rate of feed | $H_2O_2$ in vapor from 2nd still | Overall efficiency |
| --- | --- | --- | --- |
|  | Liters per hour | Percent by weight | Percent |
| 1 | 20 | 1.6 | 91 |
| 2 | 35 | 2.7 | 95 |
| 3 | 21 | 1.7 | 92 |

Although we have illustrated our invention by a process whereby the liquid to be hydrolyzed and distilled is passed continuously through a heated tube, our invention is not restricted thereto, but is applicable to various known methods of vacuum distillation. Likewise, the apparatus which comprises a part of our invention is not restricted to the particular form shown but may include other types of distillation apparatus arranged in a similar manner. That is, our novel apparatus comprises an arrangement of two separate stills adapted for continuous distillation and connected in such manner that the liquid residue from the first still may continuously pass into the distillation chamber of the second still, and further, the provision for a means of introducing water or steam into the liquor within, or passing into, the second still, or into the vapor phase in the second still. The water or steam inlet may be adapted either to introduce water or steam into the liquid before it enters the second still or to introduce water or steam at any desired point in the second still. For the sake of convenience, we prefer to arrange the apparatus so that steam may be introduced into contact with the liquor simultaneously with its introduction into the second still. Further, our invention as to apparatus is not limited to a unit consisting of two stills but may comprise any desired plurality of stills connected in series in the above-described manner.

In carrying out our process it is not essential that continuous methods of distillation be utilized; batch methods may be used if desired. For example, a dilute persulfate solution may be distilled in any suitable type of still, preferably at a substantially constant temperature or within a narrow temperature range. Then, in accordance with our invention, a quantity of water is added to the residue and the distillation is repeated. This procedure may be repeated any desired number of times until the residue is substantially free from persulfates or other peroxygen compounds. The required water added during or prior to the second or subsequent distillation may be added either in the form of liquid water or as steam; it may be added either as a continuous stream or in one or more large portions.

Another method of carrying out our invention comprises passing the persulfate solution through a heated tube and introducing steam at one or more convenient points in the tube, for example, at about the mid-point thereof. It will be noted that this method differs from the methods described above, for instance Example II, in that the hydrogen peroxide vapors are not removed prior to the introduction of the steam. Although our process may be carried out without removing the peroxide vapors prior to introduction of additional steam or water, we prefer to remove the peroxide vapors prior to the introduction of additional water, in order to obtain the maximum overall efficiency.

The amount of water or steam required to be added will depend upon the temperature at which the distillation is carried out and the number of distillation steps which are to be used. In general, at lower distillation temperatures more water is required or, in other words, by increasing the amount of water added the required distillation temperature is correspondingly reduced. Hence, in general the more water that is added during the process, the higher will be the overall efficiency. However, there is a practical limit to the amount of water or steam that may be added since excessive amounts will result in a distillate too dilute for economical concentration to solutions of commercial strengths. We prefer to add not more than that amount of water which will result in a distillate containing not less than about 1 to 3% by weight of hydrogen peroxide, such distillate resulting from combining the distillates from the first and second stages.

The minimum amount of water to be added is likewise determined by practical considerations. The addition of small amounts of water will have some advantageous effect in increasing the efficiency. However, if a distillation efficiency of 85% or higher is to be had, the amount of water added in general should be sufficient to obtain a combined distillate containing not more than around 6% by weight of hydrogen peroxide.

The still pressures and temperatures in our process ordinarily will not vary greatly from those heretofore commonly used in the art of hydrolyzing persulfuric acid or persulfates by vacuum distillation; we prefer to operate at temperatures not over about 120° C. and at pressures of about 120 to 200 mm.

In the appended claims, the term "persulfate solution" is meant to include any solution containing either persulfuric acid or its salts, whether obtained by electrolysis of sulfuric acid or a sulfate or by other means.

We claim:

1. A process for hydrolyzing and distilling a solution of a persulfate in a plurality of stages which comprises distilling said solution in the first stage under a pressure less than atmospheric to vaporize water together with a part of the available hydrogen peroxide resulting from the hydrolysis of said persulfate solution, separating substantially all the vapors thus formed from the liquid residue, adding water to said liquid residue and distilling said diluted residue in a subsequent stage.

2. A process for hydrolyzing and distilling a solution of persulfuric acid in a plurality of stages which comprises distilling said solution under a pressure of 120 to 200 millimeters of mercury at a temperature not exceeding about 120° C. to vaporize water together with part of the available hydrogen peroxide resulting from the hydrolysis of said persulfuric acid, separating substantially all the vapors thus formed from the liquid residue, adding steam to said liquid residue and distilling said residue in a subsequent stage.

3. A process for producing hydrogen peroxide which comprises distilling a solution of persulfuric acid in a plurality of stages under a pressure of about 120 to 200 millimeters of mercury at a temperature not exceeding about 120° C. to vaporize water together with part of the available hydrogen peroxide resulting from the hydrolysis of said persulfuric acid, separating substantially all the vapors thus formed from the liquid residue, introducing steam into said liquid residue, and thereafter distilling said liquid residue in a subsequent stage at the aforesaid temperature and pressure.

4. A process for producing hydrogen peroxide which comprises distilling a solution of a persulfate in a plurality of stages under a pressure less than atmospheric to vaporize water together with part of the available hydrogen peroxide resulting from hydrolysis of said persulfate solution, separating substantially all the vapors thus formed from the liquid residue, adding water to said liquid residue, and thereafter distilling the resulting solution in a subsequent stage at a pressure less than atmospheric, the quantity of water added to said residue being such that a solution resulting by condensing the combined vapors from said distillation stages will contain not more than about 6% by weight of hydrogen peroxide.

5. A process for distilling a solution of a persulfate in a plurality of stages to produce hydrogen peroxide which comprises passing said solution through a heated tube in the first stage under a pressure less than atmospheric, separating substantially all the resulting vapors of water and hydrogen peroxide from the liquid-vapor mixture issuing from said tube, adding water to the residual liquid and re-distilling the resulting solution in a subsequent stage under a pressure less than atmospheric.

6. A process for distilling a solution of a persulfate in a plurality of stages to produce hydrogen peroxide which comprises passing said solution through a heated tube in the first stage under a pressure less than atmospheric, separating substantially all the resulting vapors of water and hydrogen peroxide from the liquid-vapor mixture issuing from said tube, adding water to the residual liquid, and re-distilling the resulting solution under a pressure less than atmospheric in a subsequent stage, the quantity of water added to said residual liquid being so adjusted that a solution resulting by condensing the combined vapors from said distillation stages will contain not more than about 6% by weight of hydrogen peroxide.

7. A process for distilling a solution of persulfuric acid to produce hydrogen peroxide in a plurality of stages which comprises passing said solution through a heated tube under a pressure of about 120 to 200 millimeters of mercury in a first stage distillation, separating substantially all the resulting vapors of water and hydrogen peroxide from the liquid-vapor mixture issuing from said tube, re-distilling said residual liquid in a subsequent stage under a pressure less than atmospheric by passing it through a second heated tube while simultaneously introducing steam thereinto, and separating the resulting vapors from the residual liquid, the quantity of steam introduced during said second stage distillation being so adjusted that a solution resulting by condensing the combined vapors from said distillation stages will contain from about 1 to 6% by weight of hydrogen peroxide.

8. A process for hydrolyzing and distilling a solution of persulfuric acid in a plurality of stages which comprises distilling said solution in the first stage under a pressure less than atmospheric to vaporize water together with part of the available hydrogen peroxide resulting from the hydrolysis of said persulfuric acid solution, separating substantially all the vapors thus formed from the liquid residue, adding water to said liquid residue and distilling said residue in a subsequent stage.

9. A process for distilling a solution of persulfuric acid in a plurality of stages to produce hydrogen peroxide which comprises passing said solution through a heated tube in the first stage under a pressure less than atmospheric, separating substantially all the resulting vapors of water and hydrogen peroxide from the liquid-vapor mixture issuing from said tube, adding steam to said residual liquid, and re-distilling the resulting solution in a subsequent stage under a pressure less than atmospheric.

CARL WILLIAM TUCKER.
FRANK DORRILL.